(12) United States Patent
Brooks et al.

(10) Patent No.: US 10,285,011 B2
(45) Date of Patent: May 7, 2019

(54) DETERMINING LOCATIONS FOR LOCATION SIGNATURES (71) Applicant: Hewlett-Packard Development Company, L.P., Houston, TX (US)

(72) Inventors: Robert C Brooks, Houston, TX (US); Isaac Lagnado, Houston, TX (US); Robin Castell, Houston, TX (US)

(73) Assignee: Hewett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/771,661

(22) PCT Filed: Feb. 5, 2016

(86) PCT No.: PCT/US2016/016704
§ 371 (c)(1),
(2) Date: Apr. 27, 2018

(87) PCT Pub. No.: WO2017/135961
PCT Pub. Date: Aug. 10, 2017

(65) Prior Publication Data
US 2018/0317046 A1   Nov. 1, 2018

(51) Int. Cl.
*H04W 4/02* (2018.01)
*H04W 64/00* (2009.01)
(Continued)

(52) U.S. Cl.
CPC ........... *H04W 4/023* (2013.01); *G01S 5/0252* (2013.01); *G06F 21/316* (2013.01); *H04W 4/02* (2013.01);
(Continued)

(58) Field of Classification Search
CPC ..... H04W 4/023; H04W 4/029; H04W 64/00; H04W 4/027; H04W 4/80; G01S 5/0252
See application file for complete search history.

(56) References Cited

U.S. PATENT DOCUMENTS 8,666,429 B1   3/2014 Bali
8,855,667 B2   10/2014 Lada et al.
(Continued)

FOREIGN PATENT DOCUMENTS

EP          2878924 A1     6/2015
WO    WO-2014074837 A1    5/2014

OTHER PUBLICATIONS

Chapre, Y et al, "Received Signal Strength Indicator and It's Analysis in a Typical WLAN System", Jul. 29, 2013 ~ Short Paper ~ 4 pages.
(Continued)

*Primary Examiner* — Joseph E Dean, Jr.
(74) *Attorney, Agent, or Firm* — HPI Patent Department (57) ABSTRACT

An example system includes a location signature engine to determine a location signature based on a location of a user. The system also includes a signature comparison engine to determine whether the location signature matches a known signature. The system also includes a location determination engine to prompt the user for the location of the user based on the location signature not matching the known signature. The location determination engine also is to determine whether a user indication of the location is accurate.

15 Claims, 6 Drawing Sheets

(51) Int. Cl.
  *H04W 4/80* (2018.01)
  *G06F 21/31* (2013.01)
  *G01S 5/02* (2010.01)
  *H04W 4/029* (2018.01)
(52) U.S. Cl.
  CPC .......... *H04W 4/027* (2013.01); *H04W 4/029* (2018.02); *H04W 64/00* (2013.01); *G06F 2221/2111* (2013.01); *H04W 4/80* (2018.02)

(56) References Cited

U.S. PATENT DOCUMENTS

| | | |
|---|---|---|
| 10,043,365 B2 * | 8/2018 | Ye .................. H04W 64/006 |
| 2006/0106898 A1 | 5/2006 | Frondozo |
| 2012/0040653 A1 * | 2/2012 | Mendis ................ G01S 5/0252 455/414.2 |
| 2013/0055370 A1 * | 2/2013 | Goldberg ................ G06F 21/31 726/7 |
| 2014/0087762 A1 | 3/2014 | Galvin et al. |
| 2014/0249771 A1 | 9/2014 | Yang et al. |
| 2014/0349682 A1 | 11/2014 | Nawaz |
| 2015/0046982 A1 | 2/2015 | Wolcott et al. |
| 2015/0331938 A1 | 11/2015 | Kalampoukas et al. |

OTHER PUBLICATIONS

Liu et al, "Survey of Wireless Indoor Positioning Techniques and Systems", IEEE ~ Nov. 2007 ~ 14 pages.
Wauters, Robin, "Aero Scout Raises $16 Million for Real-Time Location Technology," TechCrunch, Nov. 4, 2010 ~ 5 pages.

* cited by examiner

DETERMINING LOCATIONS FOR LOCATION SIGNATURES

BACKGROUND

Computing devices, such as smart phones, tablets, notebooks, desktops, etc., are becoming ubiquitous. The computing devices may have various functionalities that may be built in or added by external connected devices. For example, the computing devices may include a wireless adapter to communicatively couple the computing device to a wireless network or a remote device. The wireless adapter may communicate according to the Institute of Electrical and Electronics Engineers (IEEE) 802.11 protocol (e.g., WiFi, WiGig, etc.), the Bluetooth protocol, near field communication (NFC) protocols, or the like. The computing device may include a camera or a microphone to capture images, video, or audio. The computing device may include a compass.

DETAILED DESCRIPTION

Users often carry a computing device with them. Accordingly, if the computing device can identify the location of the user, the user will be able to determine the user's location without carrying any additional equipment. When the user is outside, a global navigation service can be used to determine the user's location. For example, radio signals from satellites may be compared to determine the user's location. However, the radio signals for the global navigation service may have difficulty penetrating buildings and may not be precise enough to distinguish nearby indoor locations from one another.

The computing device may determine locations inside a building based on characteristics of the building or infrastructure installed in the building. For example, the building characteristics or infrastructure may include radio frequency (RF) signals, wireless access points (e.g., WiFi access points, etc.), wireless devices or beacons (e.g., Bluetooth, WiGig, NFC, etc. devices or beacons), audio noises (e.g., heating, ventilation, or air conditioning (HVAC) noise, etc.), ambient lighting, visual appearance, magnetic fields, or the like. The computing device may perform measurements to determine the location of the user based on the building characteristics or infrastructure. For example, the computing device's wireless adapter may determine a service set identifier (SSID) for a WiFi access point or an identifier for a wireless device or beacon, or the wireless adapter may determine a receive signal strength indicator (RSSI) for the WiFi access point, wireless device, or wireless beacon. Alternatively, or in addition, the computing device's microphone may measure audio noise, or the computing device's camera may measure ambient light or capture an image of the computing device's surroundings. In an example, the computing device may include a compass to measure the direction or strength of a magnetic field.

A site survey may need to be performed to associate the measurements with locations at the site. However, performing a site survey may be time consuming and expensive. Moreover, environmental changes may produce inaccuracies in the associations between the measurements and the locations. For example, movement of furniture or fixtures, failures of access points or wireless devices or beacons, or the like may change the measurements acquired at various locations. Accordingly, the site survey may need to be refreshed periodically, which may increase the time and expense. The time and expense could be reduced if associations between measurements and locations were automatically determined and updated.

Figure 1:
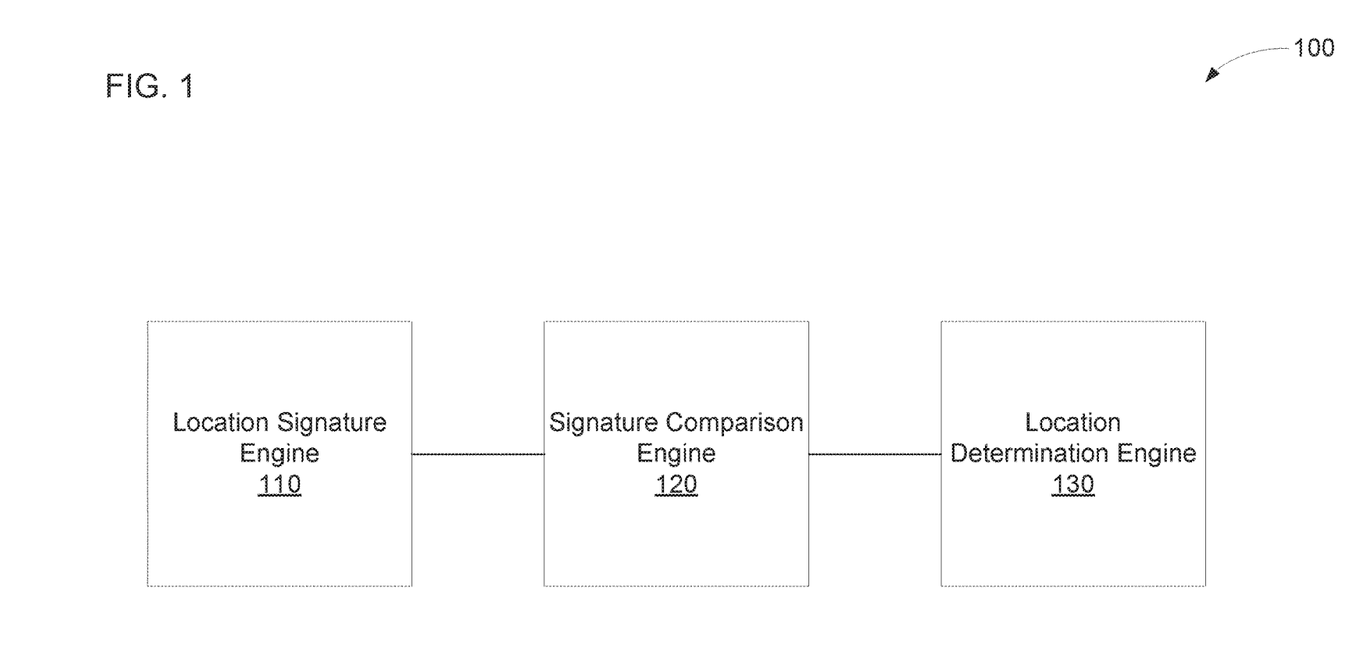
FIG. 1 is a block diagram of an example system to relate location signatures to locations.

FIG. 1 is a block diagram of an example system 100 to relate location signatures to locations. The system 100 may include a location signature engine 110. As used herein, the term "engine" refers to hardware (e.g., a processor, such as an integrated circuit or other circuitry) or a combination of software (e.g., programming such as machine- or processor-executable instructions, commands, or code such as firmware, a device driver, programming, object code, etc.) and hardware. Hardware includes a hardware element with no software elements such as an application specific integrated circuit (ASIC), a Field Programmable Gate Array (FPGA), etc. A combination of hardware and software includes software hosted at hardware (e.g., a software module that is stored at a processor-readable memory such as RAM, a hard disk or solid-state drive, resistive memory, or optical media such as a digital versatile disc (DVD), and/or executed or interpreted by a processor), or hardware and software hosted at hardware.

The location signature engine 110 may determine a location signature based on a location of a user. For example, the location signature engine 110 may convert measurements of building characteristics or infrastructure into the location signature. The measurements may vary based on the location at which they are taken. The measurements may be made by the location signature engine 110 or may be made remotely from the system 100. The location signature engine 110 may generate location signatures based on the measurements, so the location signatures may vary based on the location at which the measurements were taken. The location signature engine 110 may generate location signatures that reduce or cancel noise in the measurements.

The system 100 may also include a signature comparison engine 120. The signature comparison engine 120 may determine whether the location signature matches a known signature. For example, the signature comparison engine 120 may store known signatures, and the signature comparison engine 120 may compare the location signature to the stored known signatures. Alternatively, or in addition, the known signatures may be stored remotely, and the signature comparison engine 120 may transmit the location signature to a remote device (not shown) for comparison to the known signatures. The remote device may indicate to the comparison engine 120 whether a match was found. In some cases, the signature comparison engine 120 may determine that the location signature does not match any known signatures.

The system 100 may include a location determination engine 130. The location determination engine 130 may prompt a user for the location of the user based on the location signature not matching the known signature. For example, the user may have a computing device (not shown), and the location determination engine 130 may instruct the computing device to prompt the user for the location. The computing device may indicate the location received from the user to the location determination engine 130. Alternatively, or in addition, the user may be in possession of the system 100. The location determination engine 130 may cause a user interface (not shown) to prompt the user for the location.

The location determination engine 130 may determine whether a user indication of the location is accurate. For example, the location determination engine 130 may compare the user indication of the location to indications of the location from other users. Alternatively, or in addition, the location determination engine 130 may compare the user indication of the location to previous locations, previous location signatures, general information indicative of the user's location, or the like. Based on the comparisons, the location determination engine 130 may determine how likely the location accuracy, may determine the likelihood the accuracy exceeds a threshold, or the like.

Figure 2:
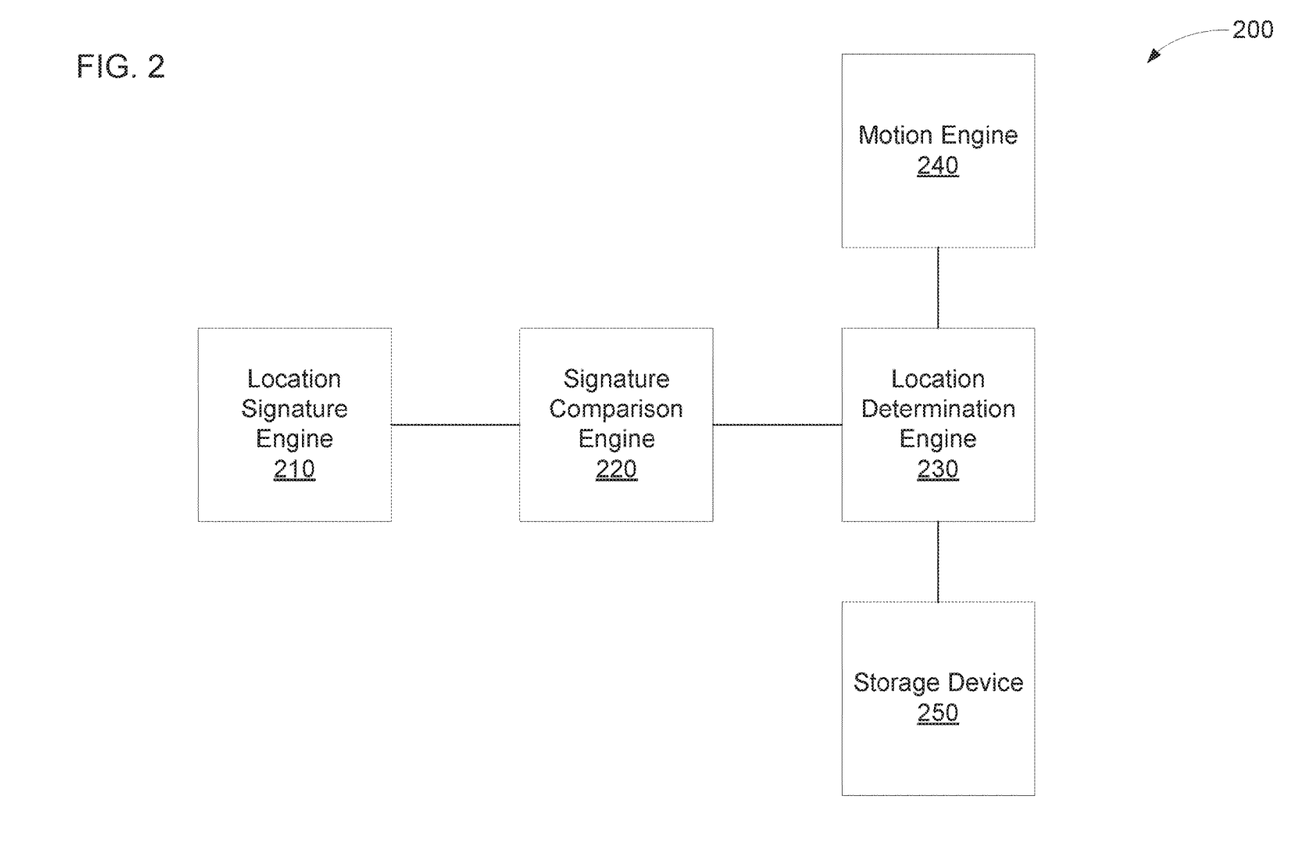
FIG. 2 is a block diagram of another example system to relate location signatures to locations.

FIG. 2 is a block diagram of another example system 200 to relate location signatures to locations. The system 200 may include a location signature engine 210. The location signature engine 210 may determine a location signature based on a location of a user. In an example, a computing device that can be carried by the user may include the system 200, and the location signature engine 210 may determine the location of the user based on the location of the system 200. Alternatively, or in addition, the location signature engine 210 may be located remotely from the user, such as at a remote server, and the location signature engine 210 may determine the location of the user based on a remote device (not shown) carried by the user.

The location signature engine 210 may determine the location signature based on measurements dependent on the user's location. For example, the measurements may include an SSID or identifier for a WiFi access point, wireless device, or wireless beacon; measurements of an RSSI for a WiFi access point, wireless device, or wireless beacon; measurements of proximity to a WiFi access point, wireless device, or wireless beacon; measurements of audio noises; measurements of ambient light; an image of the user's surroundings; measurements of magnetic field direction or strength; or the like. As used herein, the term "location signature" refers to information indicative of a location and derived from environmental measurements. In an example, the location signature engine 210 may convert the measurements into the location signature. The location signature engine 210 may perform an operation on the measurements to reduce noise. For example, the location signature engine 210 may average or filter the measurements. The location signature engine 210 may compress, quantize, or extract certain information from the measurements in some examples. The location signature may include a time stamp, or the location signature engine 210 may include a time stamp with the location signature.

The system 200 may include a signature comparison engine 220. The signature comparison engine 220 may receive the location signature from the location signature engine 210. The signature comparison engine 220 may determine whether the location signature matches known signatures. In the illustrated example, the system 200 includes a storage device 250. The storage device 250 may store the known signatures. The signature comparison engine 220 may receive the known signatures from the storage device 250 and compare the location signature to the received signatures. Alternatively, or in addition, the signature comparison engine 220 may transmit the location signature to a remove device (not shown), such as a remote server, to compare the location signature to the known signatures.

In an example, the signature comparison engine 220 may determine that the location signature matches a known signature. The storage device 250 may contain a data structure that relates each known signature to an indication of a location. The signature comparison engine 220 may request the indication of the location from the storage device 250 based on the location signature matching the known signature. The signature comparison engine 220 may report the location associated with the known signature to the user. For example, the signature comparison engine 220 may provide the indication of the location to a user interface (not shown), which may indicate the location to the user. Alternatively, or in addition, the signature comparison engine 220 may transmit the indication of the location to a remote device carried by the user, and the remote device may indicate the location to the user. In an example, the signature comparison engine 220 may save the location and may make the location as well as information identifying the user, a time stamp, or the like available to other users. Alternatively, or in addition, the signature comparison engine 220 may provide the location, identifying information, time stamp, etc. to a remote server, which may make the information available to other users.

The data structure may relate location signatures to locations at different levels of granularity. For example, the signature comparison engine 220 may use multiple thresholds when determining whether the location signature matches a known signature. If a lower threshold is satisfied, the signature comparison engine 220 may determine the user's general location and report the general location to the user. If a higher threshold is satisfied, the signature comparison engine 220 may determine the user's specific location and report the specific location. In an example, the signature comparison engine 220 may provide the location to the user at the most specific level of granularity determined.

The system 200 may include a location determination engine 230. In some situations, the location signature may not match any known signatures. The signature comparison engine 220 may indicate to the location determination engine 230 that the location signature does not match any known signatures. The location determination engine 230 may determine a location that corresponds to the location signature. In an example, the location determination engine 230 may prompt the user for the user's location. The location determination engine 230 may instruct a local user interface or a remote device to prompt the user for the user's location.

The location determination engine 230 may receive a user indication of the user's location. For example, the user interface or the remote device may receive the indication of the user's location from the user. The user interface or the remote device may provide the user indication of the user's location to the location determination engine 230. The location determination engine 230 may determine whether the user indication of the location is accurate. In an example, the location determination engine 230 may determine whether the user indication of the location is accurate by determining whether at least a threshold number of users have indicated the location corresponds to the location signature. The threshold may be predetermined or adjusted dynamically, for example, based on the accuracy of previous indications from the users, the number of previous indications from the users, or the like.

In an example, the location determination engine 230 may compare the similarity of the location signature and another location signature to the distance between the user indication of the location and the location associated with the other location signature. The location determination engine 230 may determine the threshold or may determine whether the user indication of the location is accurate based on the comparison. The location determination engine 230 may analyze previous locations or location signatures of the user to determine the threshold or to determine whether the user indication of the location is accurate. For example, the location determination engine 230 may determine that sudden large changes in the location signature or location are unlikely to be accurate (particularly a large change in one but not the other).

The location determination engine 230 may limit how often it prompts the user. For example, the location determination engine 230 may distribute the prompts among a plurality of users so that no individual user is prompted too many times. Accordingly, the location determination engine 230 may not prompt the user if the user has already been prompted too many times recently even though a match was not found. In an example, the location determination engine 230 may determine a threshold for how often to prompt the user based on previous responsiveness, accuracy of previous responses, a previously indicated preference, or the like. The location determination engine 230 may prioritize which user it prompts so that users that visit more obscure locations are prompted about those locations rather than common locations.

In some examples, the location determination engine 230 may determine the location without prompting the user. For example, the location determination engine 230 may determine the location based on a hardware configuration or user information. As used herein, the term "hardware configuration" refers to information about the current or permanent state of an internal or external hardware device. The hardware configuration may include an Internet Protocol (IP) address for a wired network connection, an identification number of a peripheral, an identification number of a docking station, or the like. For example, the locations of wired network connections, peripherals, docking stations, etc. may be known already. Indications of the locations may be stored, e.g., in the storage device 250, in a remote server, etc., in association with the IP address or identification number of the wired network connection, peripheral, docking station, etc. at those locations. The location determination engine 230 may determine the hardware configuration and may retrieve the indication of the associated location. The location determination engine 230 may receive an indication of the hardware configuration from a computing device in the possession of the user, from an operating system running on the system 200, from an application running on the system 200, or the like.

As used herein, the term "user information" refers to data logically associated with the user, data input by the user, or data indicative of a physical state of the user. The user information may include an indication of a user location from a calendar application, a user status from an instant messaging client, or the like. For example, the calendar application may store indications of meeting that the user is scheduled to attend. Similarly, the status from an instant messaging client may indicate the current location of the user. The location determination engine 230 may retrieve the location from the calendar application, instant messaging client, etc. The calendar application, instant messaging client, etc. may run on the system 200, or the calendar application, instant messaging client, etc. may run on a remote device (e.g., a remote server). In some examples, the location determination engine 230 may translate a format of the location. For example, the user information may indicate the location as a room name, so the location determination engine 230 may translate the location, e.g., into coordinates.

The location determination engine 230 may determine whether the location from the hardware configuration or the user information is accurate. In an example, the location determination engine 230 may detect that the hardware configuration or user information indicates a plurality of users are in a same room. The location determination engine 230 may use the location signatures from some or all of the users to determine what location signature or set of location signatures to associate with the location. In an example, the location determination engine 230 may detect whether any outliers are present. For example, a location signature may be significantly different from the other location signatures (e.g., because the associated user is not actually at the location indicated by the hardware configuration or user information). The location determination engine 230 may disregard any location signatures that are too dissimilar to the remaining signatures when associating location signatures with the location. Alternatively, or in addition, the location determination engine 230 may compare the location signature of a user to the location signatures of other users previously at the determined location or to the previous location signatures or locations of that user.

The location determination engine 230 may classify some users or devices as trusted and others as untrusted or guests. The location determination engine 230 may not allow untrusted users or devices to associate locations with location signatures or may apply more stringent thresholds or criteria when evaluating the accuracy of locations provided by untrusted users or devices. The signature comparison engine 220 may still compare location signatures from untrusted or guest users to known signatures to determine the location of the untrusted or guest users. In some examples, the location determination engine 230 may determine a trust rating or classify users into a plurality of trust levels. The thresholds or criteria used when evaluating accuracy of locations may vary based on the trust rating or trust level. Restricting changes by untrusted or poorly trusted users or devices may protect against malicious users attempting to spoof locations or harm the saved location data.

The location determination engine 230 may store the location signature in association with the determined location. For example, the location determination engine 230 may store the location and location signature in the storage device 250. Alternatively, or in addition, the location determination engine 230 may store the location and location signature on a remote device, such as a remote server. The location determination engine 230 may save the location signature and location in a data structure that associates the location signature with the location. The data structure may allow for searching for location based on location signature.

In an example, the location determination engine 230 may save the location signature and location based on a determination the location signature is accurate. The location determination engine 230 may discard a location determined to be inaccurate or may save the location signature and location separately from the data structure used to determine the locations of users. If the accuracy of a location cannot be determined, the location determination engine 230 may save the location and location signature for later verification (e.g., against similar locations or location signatures determined in the future). Alternatively, or in addition, the location determination engine 230 may save locations and location signatures of unknown accuracy in the data structure used to determine the location of users, but the potential lack of accuracy or a confidence measure may be indicated to the user.

The location determination engine 230 may determine a location that matches a saved location even though the location signature does not match any known signatures. For example, there may have been changes to the building characteristics or infrastructure that result in changes to the location signature. The location determination engine 230 may replace the signature previously associated with the location with the location signature determined most recently. The location determination engine 230 may apply a threshold for replacing the location signature. For example, the new location signature may need to be detected a threshold number of times before the location signature is replaced. The threshold may be determined dynamically based on a confidence in the previous location signature, a confidence in the users reporting the change, or the like. Alternatively, or in addition, both location signatures may be associated with the location, and the signature comparison engine 220 may indicate the location in response to a match to either location signature.

The location determination engine 230 may analyze the time stamps associated with location signatures to determine whether a location signature should be replaced or to detect trends. For examples, the location determination engine 230 may determine whether a location signature is stale/old based on the age indicated by a time stamp. The location determination engine 230 may apply a lower threshold for replacing older location signatures. The location determination engine 230 may detect trends that result in changes to the location signature over time (e.g., during a day, during a month, during a year, etc.). For example, doors may be opened or closed at regular times of day and affect RF signals; ambient light may change based on the time of year; ambient noise may be affected by freeway noise, which may change with time of day or the day of the week or year; ambient noise may be affected by changes to HVAC operation, which may change with the time of day or day of the year; etc.

The system 200 may include a motion engine 240 to detect whether the user is moving. For example, the motion engine 240 may include an accelerometer to detect motion of the system 200, or a computing device in the user's possession may include an accelerometer, which may detect motion of the user. In an example, the system 200 may not include a motion engine 240, and the location signature engine 210 may instead detect motion based on changes in the location signature. In an example, the location determination engine 230 may wait to determine the user's location until the user is stationary. For example, ambient light measurements may be inaccurate if the user is moving and the system 200 or a computing device is in a bag or pocket. In addition, a response to a prompt, a hardware configuration, or user information may be inaccurate while the user is moving. The motion engine 240 may also make an indication of the user's motion available to other users. Alternatively, or in addition, the motion engine 240 may provide the indication of the user's motion to a remote server, which may make the indication available to other users. For example, the other users could receive notification that the user is in motion, is transiting a particular location, or the like, or the other users could view location and motion when requesting the user's status.

In an example, the location determination engine 230 may compare motion detected by the motion engine 240 to changes in location signature to determine whether a location or location signature is accurate. For example, the location determination engine 230 may determine a distance traveled based on the motion engine 240 and compare the distance traveled to the distance between the user's previous location and current location. If the distance between locations is more than a particular threshold larger than the distance traveled, the location determination engine 230 may determine the location is inaccurate. If the location determination engine 230 detects a sudden change in the location signature without the motion engine 240 detecting any motion, the location determination engine 230 may determine a change to building characteristics or infrastructure has occurred (and the location signature for the current location should be updated) or an erroneous location signature has been received.

Figure 3:
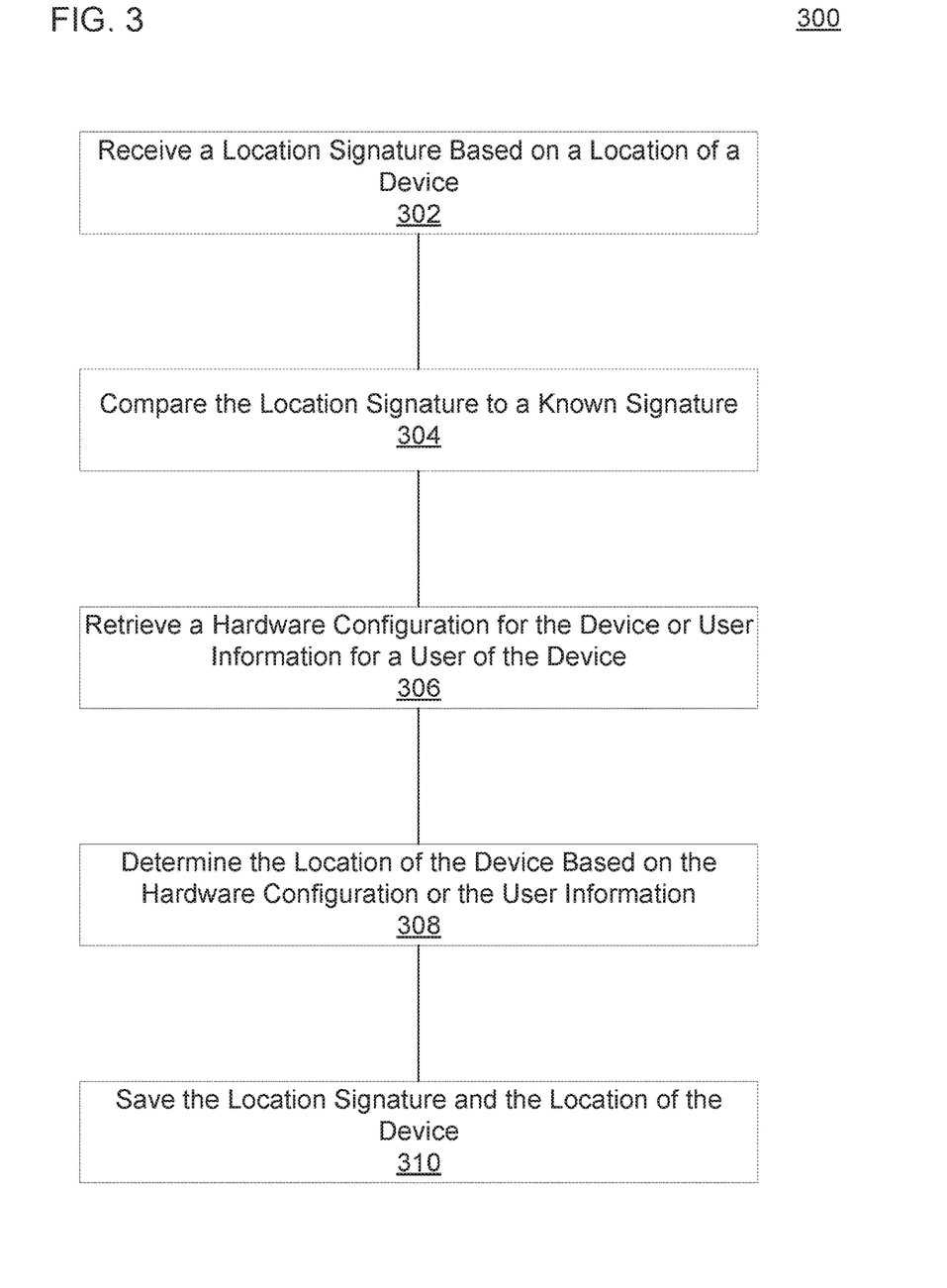
FIG. 3 is a flow diagram of an example method to relate location signatures to locations.

FIG. 3 is a flow diagram of an example method 300 to relate location signatures to locations. A processor may perform the method 300. At block 302, the method 300 may include receiving a location signature based on a location of a device. For example, the location signature may be generated based on building characteristics or infrastructure near the device. In some examples, the location signature may be generated by the device or based on measurements by the device. The location signature may be received from a local source or a remote source. Block 304 may include comparing the location signature to a known signature. Comparing the location and known signature may include determining whether the signatures are an exact match, determining whether the signatures are within a predetermined threshold of each other, or the like.

Block 306 may include retrieving a hardware configuration for the device, user information for a user of the device, or the like based on the location signature not matching the known signature. For example, the hardware configuration, the location signature, etc. may be retrieved from the device, retrieved from a local source (e.g., an operating system, a software application, etc.), retrieved from a remote server, or the like. At block 308, the method 300 may include determining the location of the device based on the hardware configuration, the user information, or the like. For example, the hardware configuration, the user information, or the like may directly indicate the location, may be translatable to a format readable to determine the location, may be usable to look up the location, or the like. Block 310 may include saving the location signature and the location or the device. The location signature and the location may be associated with each other when saved. For example, the location may be accessible based on the location signature. The location signature and the location may be saved locally or at a remote device, such as a remote server. In an example, the location signature engine 110 of FIG. 1 may perform block 302; the signature comparison engine 120 may perform block 304; and the location determination engine 130 may perform blocks 306-310.

Figure 4:
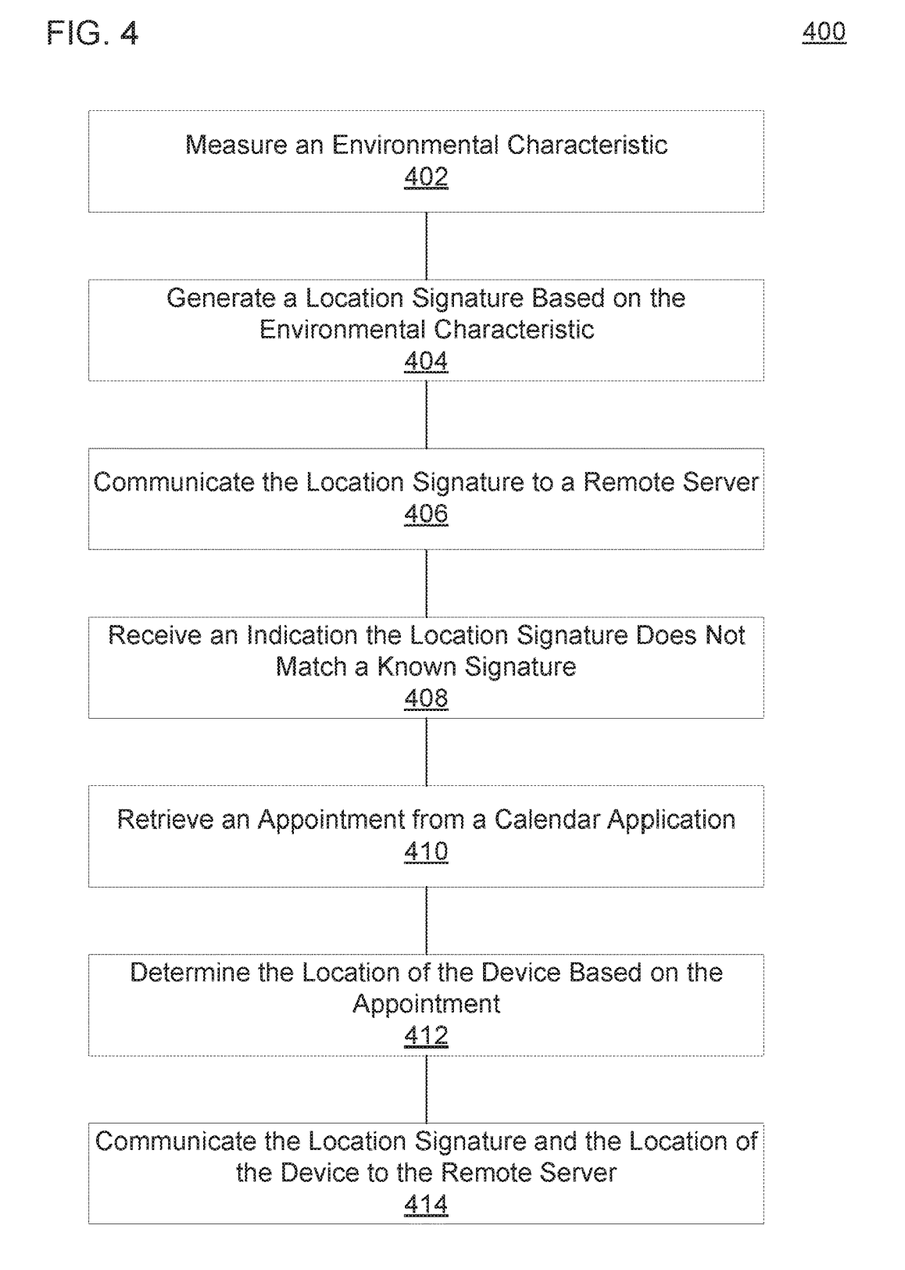
FIG. 4 is a flow diagram of another example method to relate location signatures to locations.

FIG. 4 is a flow diagram of another example method 400 to relate location signatures to locations. At block 402, the method 400 may include measuring an environmental characteristic. For example, the environmental characteristic may be a building characteristic, an infrastructure characteristic, or the like. The environment characteristic may include an SSID or identifier for a WiFi access point, wireless device, or wireless beacon; measurements of an RSSI for a WiFi access point, wireless device, or wireless beacon; measurements of proximity to a short distance transmitter (e.g., a WiFi access point, a wireless device, a wireless beacon, etc.); measurements of audio from a device microphone; measurements of ambient light; an image from a device camera; measurements of magnetic field direction or strength; or the like.

Block 404 may include generating a location signature based on the environmental characteristic. Generating the location signature may include extracting information from the measurement. For example, extracting information may include performing feature extraction, performing a Fourier transform, edge detection, or the like. Generating the location signature may include performing a noise reduction operation on the measurement or extracted information. Generating the location signature may also include compressing, quantizing, etc. the measurement or extracted information.

Block 406 may include communicating the location signature to a remote server. Communicating the location signature to the remote server may include transmitting the location signature over a network, such as the Internet. The remote server may maintain a database of known signatures. The remote server may compare the location signature to the known signatures to determine whether the location signature matches a known signature. Block 408 may include receiving an indication that the location signature does not match a known signature. For example, the remote server may determine that the location signature does not match any known signatures. The indication that the location signature does not match a known signature may be received over the network.

At block 410, the method 400 may include retrieving user information, such as an appointment from a calendar application. Alternatively, the user information may include a user status from an instant messaging client. For example, the user status may be a manually or automatically set indication of the user's location. In some examples, a hardware configuration may be retrieved. The hardware configuration may include an IP address for a wired network connection, an identification number of a peripheral or docking station, or the like. Retrieving the appointment from the calendar application may include directly requesting the appointment from the calendar application, requesting the appointment from a server with access to calendar application data for a plurality of users, or the like.

At block 412, the method 400 may include determining the location of the device based on the appointment. In an example, the location may be stored in a field of the appointment. Accordingly, determining the location may include extracting the location from the field. The location may be translated to a different format (e.g., from words to coordinates, etc.). Locations in user statuses from instant messaging clients may be similarly extracted, translated, or the like. If a hardware configuration was retrieved, the location corresponding to the hardware configuration may be looked up. For example, a remote server may store a data structure relating hardware configurations to location. Block 414 may include communicating the location signature and the location of the device to the remote server. The location signature and the location may be transmitted over the network, and the remote server may store the location signature and the location in the database of known signatures. Referring to FIG. 1, the location signature engine 110, for example, may perform blocks 402 and 404; the signature comparison engine 120, for example, may perform blocks 406 and 408; and the location determination engine 130, for example, may perform blocks 410-414.

Figure 5:
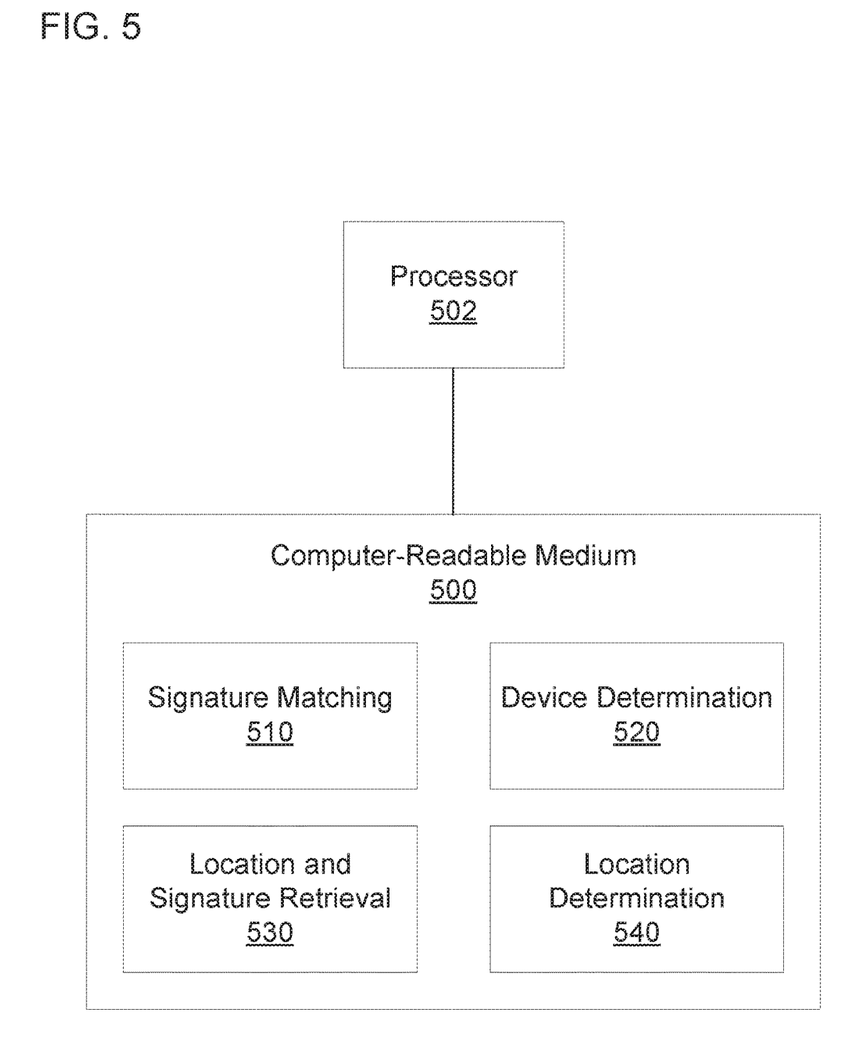
FIG. 5 is a block diagram of an example computer-readable medium including instructions that cause a processor to relate location signatures to locations.

FIG. 5 is a block diagram of an example computer-readable medium 500 including instructions that, when executed by a processor 502, cause the processor 502 to relate location signatures to locations. The computer-readable medium 500 may be a non-transitory computer readable medium, such as a volatile computer readable medium (e.g., volatile RAM, a processor cache, a processor register, etc.), a non-volatile computer readable medium (e.g., a magnetic storage device, an optical storage device, a paper storage device, flash memory, read-only memory, non-volatile RAM, etc.), and/or the like. The processor 502 may be a general purpose processor or special purpose logic, such as a microprocessor, a digital signal processor, a microcontroller, an ASIC, an FPGA, a programmable array logic (PAL), a programmable logic array (PLA), a programmable logic device (PLD), etc.

The computer-readable medium 500 may include a signature matching module 510. As used herein, a "module" (in some examples referred to as a "software module") is a set of instructions that when executed or interpreted by a processor or stored at a processor-readable medium realizes a component or performs a method. The signature matching module 510 may include instructions that cause the processor 502 to determine a location signature to be identified does not match a known signature. For example, the signature matching module 510 may cause the processor 502 to compare the location signature to the known signature, transmit the location signature to a remote server for comparison to the known signature, or the like. The computer-readable medium 500 may include a device determination module 520. The device determination module 520 may include instructions that cause the processor 502 to determine a plurality of devices potentially usable to identify the location signature. For example, the device determination module 502 may cause the processor 502 to determine the plurality of potentially usable devices based on characteristics of the devices or their users, based on a current state of the devices or their users, or the like.

The computer-readable medium 500 may include a location and signature retrieval module 530. The location and signature retrieval module 530 may include instructions that cause the processor 502 to retrieve a location signature for each device and a location for each device. For example, the location and signature retrieval module 530 may cause the processor 502 to request the location and signature from each device. Alternatively, or in addition, the plurality of device may periodically report their location signatures or locations, and the location and signature retrieval module 530 may retrieve previously reported location signatures or locations.

The computer-readable medium 500 may include a location determination module 540. The location determination module 540 may include instructions that cause the processor 502 to determine a location associated with the location signature to be identified based on the location for one of the plurality of devices. For example, the location determination module 540 may cause the processor 502 to approximate the location associated with the location signature based on another device. Alternatively, or in addition, the device determination module 520 may cause the processor 502 to determine a device that allows the location determination module 540 to cause the processor 502 to determine the location exactly. In an example, the signature matching module 510, when executed by the processor 502, may realize the signature comparison engine 120 of FIG. 1, and the device determination module 520, the location and signature retrieval module 530, and the location determination module 540, when executed by the processor 502, may realize the location determination module 130.

Figure 6:
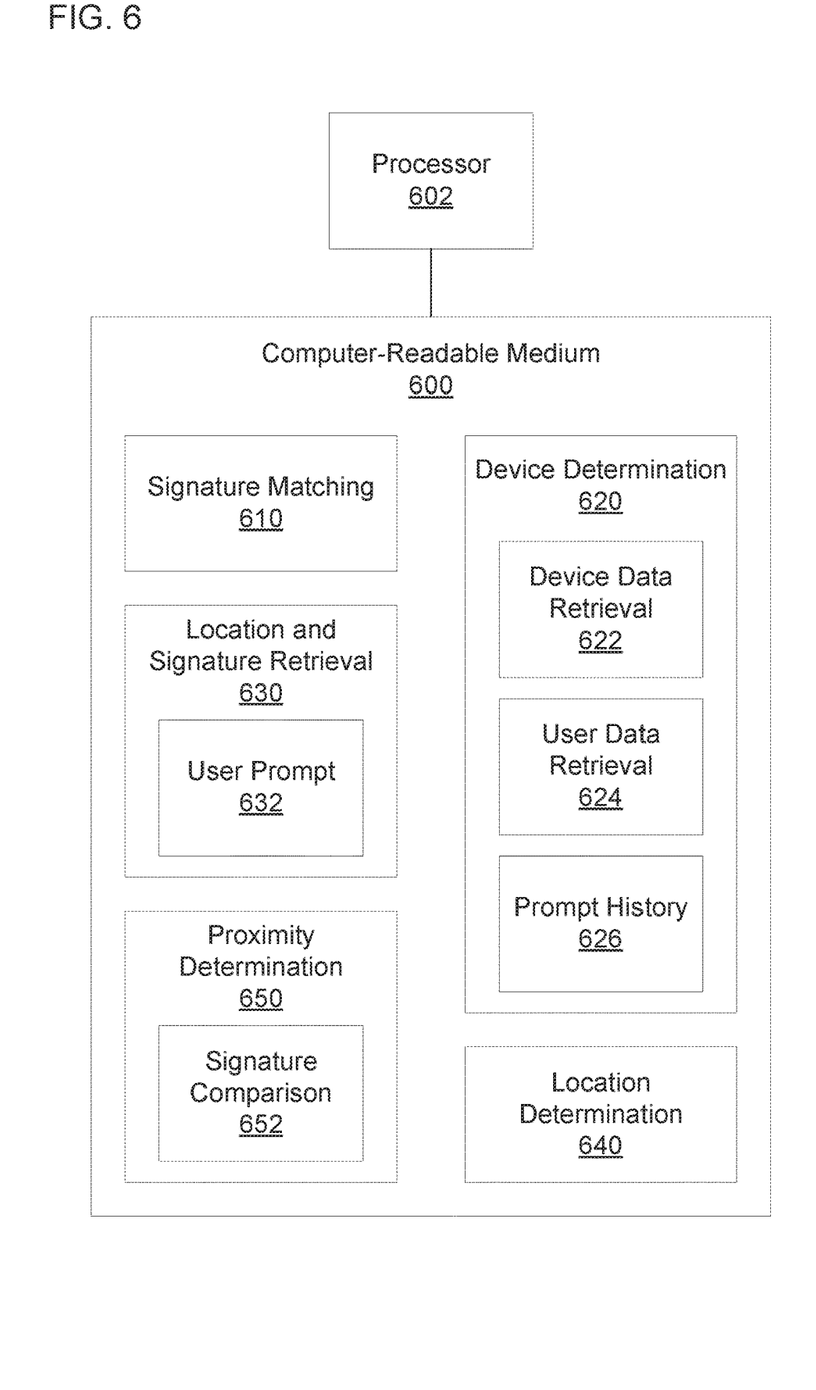
FIG. 6 is a block diagram of another example computer-readable medium including instructions that cause a processor to relate location signatures to locations.

FIG. 6 is a block diagram of an example computer-readable medium 600 including instructions that, when executed by a processor 602, cause the processor 602 to relate location signatures to locations. The computer-readable medium 600 may include a signature matching module 610. The signature matching module 610 may include instructions that cause the processor 602 to determine a location signature to be identified does not match a known signature. For example, the signature matching module 610 may cause the processor 602 to compare the location signature to the known signature and determine whether the signatures are identical or similar to within a predetermined threshold. Alternatively, or in addition, the signature matching module 610 may cause the processor 602 to communicate the location signature to a remote device, such as a remote server, perform such a comparison.

The signature matching module 610 may include instructions that cause the processor 602 to use a plurality of thresholds for different resolutions. The signature matching module 610 may cause the processor 602 to determine a location signature matches a general location at a first threshold but does not match a specific location at a second threshold. For example, the signature matching module 610 may include a building level resolution, a floor level resolution, a room level resolution, or the like. The signature matching module 610 may cause the processor 602 to determine only the building in which the user is located, to determine only the building and floor on which the user is located, to determine the building, floor, and room in which the user is location, or the like. In an example, if the most specific threshold is not satisfied, the signature matching module 610 may cause the processor 602 to request that a location determination module 640 determine a more specific location that can be associated with the location signature.

The computer-readable medium 600 may include a device determination module 620. The device determination module 620 may cause the processor 602 to determine a plurality of devices potentially usable to identify the location signature. In an example, the device determination module 620 may cause the processor 602 to determine the plurality of devices based on comparing hardware configurations or user information for the plurality of devices or their users to a hardware configuration for the device that produced the location signature to be identified or user information for a user of that device. For example, the device determination module 620 may include a device data retrieval module 622 and a user data retrieval module 624. The device data retrieval module 622 may cause the processor 602 to retrieve the hardware configuration for each device, and the user data retrieval module 624 may cause the processor 602 to retrieve the user information for the user of each device. For example, the device data retrieval module 622 and the user data retrieval module 624 may cause the processor 602 to request the hardware configuration or the user information, respectively, directly from the devices. Alternatively, or in addition, the device data retrieval module 622 and the user data retrieval module 624 may cause the processor 602 to retrieve the hardware configuration or user information from a server. In an example, the hardware configuration may be periodically reported to the server by the devices. The device determination module 620 may cause the processor 602 to determine the plurality of devices based on the hardware configurations or user information for those devices matching or being within a particular threshold of the hardware configuration or user information for the device that produced the location signature to be identified.

The device determination module 620 may also, or instead, include a prompt history module 626. The prompt history module 626 may cause the processor 602 to determine the plurality of device based on users for whom a time since prompting for location exceeds a threshold. The threshold may be predetermined or dynamic. In an example, the prompt history module 626 may cause the processor 602 to determine a time since prompting for a location for the device that produced the location signature to be identified. For example, the prompt history module 626 may cause the processor 602 to determine whether the device that produced the location signature to be identified should be prompted instead of, or in addition to, the plurality of devices. Alternatively, or in addition, the device determination module 620 may cause the processor 602 to determine the plurality of devices based on accuracy of previously reported locations, previous responsiveness, or the like. The device determination module 620 may also, or instead, cause the processor 602 to determine the plurality of devices based on devices previously near the device that produced the location signature to be identified, based on devices previously having location signatures similar to the location signature to be identified, based on devices associated with users in a same organization as the user associated with the device that produced the location signature to be identified, based on devices that are trusted, or the like.

The computer-readable medium 600 may include a location and signature retrieval module 630. The location and signature retrieval module 630 may cause the processor 602 to retrieve a location signature and a location for each device. The location and signature retrieval module 630 may cause the processor 602 to retrieve the location signature and location directly from the plurality of devices or from a server to which the devices have reported their location signatures or locations. In an example, the location and signature retrieval module 630 may include a user prompt module 632. The user prompt module 632 may cause the processor 602 to retrieve the location for each device by requesting that each device prompt an associated user for the location. For example, the plurality of devices may know their location signatures but not their locations. The plurality of devices may prompt their users for the location, and the user prompt module 632 may cause the processor 602 to receive the locations entered by the users from the plurality of devices. Alternatively, or in addition, the locations may be determined based on the hardware configuration or user information for the plurality of devices.

The computer-readable medium 600 may include a proximity determination module 650. The proximity determination module 650 may cause the processor 602 to determine a subset of the plurality of devices is near a location associated with the location signature to be identified. For example, some of the plurality of devices may not be near the location associated with the location signature despite having a hardware configuration or user information similar to that of the device that produced the location signature to be identified. Accordingly, the proximity determination module 650 may cause the processor 602 not to include such devices in the subset. In an example, the proximity determination module 650 may include a signature comparison module 652. The signature comparison module 652 may cause the processor 602 to compare the location signatures of the plurality of devices to the location signature to be identified. If the location signatures of some of the plurality of devices are not within a particular threshold of the location signature to be identified, the proximity determination module 650 may cause the processor 602 not to include those devices in the subset.

The computer-readable medium 600 may include a location determination module 640. The location determination module 640 may cause the processor 602 to determine a location associated with the location signature to be identified based on the location for one of the plurality of devices. For example, the location determination module 640 may cause the processor 602 to determine a common location for the subset of devices determined by the proximity determination module 650. The location determination module 640 may cause the processor 602 to determine the common location from the hardware configuration or user information associated with those devices. Alternatively, or in addition, the location determination module 640 may cause the processor 602 to triangulate the location based on the locations of the plurality of devices or a subset of the plurality of devices. The location determination module 640 may cause the processor 602 to determine the location based on response to prompts by users of some or all of the plurality of devices. In an example, the location determination module 640 may cause the processor 602 to save the location signature to be identified and the determined location. Referring to FIG. 1, the signature matching module 610, when executed by the processor 602, may realize the signature comparison engine 120, for example, and the device determination module 620, location and signature retrieval module 630, location determination module 640, and proximity determination module 650, when executed by the processor 602, may realize the location determination engine 130, for example.

The above description is illustrative of various principles and implementations of the present disclosure. Numerous variations and modifications will become apparent to those skilled in the art once the above disclosure is fully appreciated. Accordingly, the scope of the present application should be determined only by the following claims.

What is claimed is:

1. A system, comprising:
a processor;
a memory resource comprising instructions, that when executed, cause the processing resource to:
  determine a location signature having a first time stamp based on a location of a computing device of a user;
  determine whether the location signature matches a known signature having a second time stamp;
  determine a threshold quantity of times the computing device of the user has been prompted for the location;
  prompt the computing device of the user for the location of the user based on the location signature not matching the known signature, wherein the computing device prompts the user when the determined quantity of prompts are below the determined threshold;
  compare the first time stamp of the location signature of the computing device to other location signatures having other time stamps to determine an accuracy; and
  determine that the prompted location is accurate based on the comparison of the location signature having the first time stamp to other location signatures having other time stamps.

2. The system of claim 1, the memory resource comprising instructions that, when executed, cause the processor to:
  determine whether the user is moving; and
  prompt the user based on a determination that the user is stationary.

3. The system of claim 1, the memory resource comprising instructions that, when executed, cause the processor to:
  determine the location signature based on a location of the system.

4. The system of claim 1, the memory resource comprising instructions that, when executed, cause the processor to:
  determine the location of the system matches a saved location; and
  replace a signature associated with the saved location with the location signature.

5. The system of claim 1, the memory resource comprising instructions that, when executed, cause the processor to:
  determine another location signature matches the known signature; and
  report a location associated with the known signature to the user.

6. A method, comprising:
  receiving a location signature having a first time stamp based on a location of a device;
  comparing the location signature to a known signature having a second time stamp;
  determining a threshold quantity of times the device has been prompted for the location;
  prompting the device for the location based on the location signature not matching the known signature, wherein the device prompts a user when the determined quantity of prompts are below the determined threshold;
  comparing the first time stamp of the location signature of the device to other location signatures having other time stamps to determine an accuracy;
  retrieving a hardware configuration for the device based on the location signature not matching the known signature;
  determining the location of the device based on the hardware configuration and the prompted location; and
  saving the location signature and the location of the device.

7. The method of claim 6, wherein retrieving the hardware configuration for the device comprises retrieving at least one of an Internet Protocol (IP) address for a wired network connection and an identification number of a peripheral or docking station.

8. The method of claim 6, wherein retrieving the user information comprises retrieving at least one of a user location from a calendar application and a user status from an instant messaging client.

9. The method of claim 6, wherein receiving the location signature comprises receiving a location signature generated based on at least one of a received signal strength indicator (RSSI), an indication of proximity to a short distance transmitter, audio from a device microphone, ambient light, and an image from a device camera.

10. The method of claim 6, wherein saving the location signature and the location of the device comprises communicating the location signature and the location of the device to a server remote from the device.

11. A non-transitory computer-readable medium comprising instructions that, when executed by a processor, cause the processor to:

determine a location signature of a device having a first time stamp to be identified does not match a known signature having a second time stamp;

determine a plurality of devices potentially usable to identify the location signature;

determine a threshold quantity of times the device of has been prompted for a location corresponding to the device;

prompt the computing device of the user for the location of the user based on the location signature not matching the known signature, wherein the computing device prompts the user when the determined quantity of prompts are below the determined threshold;

compare the first time stamp of the location signature to a plurality of time stamps corresponding to the plurality of devices to determine an accuracy;

retrieve a location signature for each device and a location for each device; and determine a location associated with the location signature to be identified based on the location of the plurality of devices.

12. The computer-readable medium of claim 11, wherein the instructions, when executed, cause the processor to determine the plurality of devices based on comparing a hardware configuration for each device or user information for a user of each device with a hardware configuration for a device that produced the location signature to be identified or user information for a user of the device that produced the location signature to be identified.

13. The computer-readable medium of claim 12, wherein the instructions, when executed, cause the processor to:

determine a subset of the plurality of devices is near the location associated with the location signature to be identified; and determine the location associated with the location signature to be identified based on a common location from the hardware configuration for each device or the user information for the user of each device.

14. The computer-readable medium of claim 13, wherein the instructions, when executed, cause the processor to determine the subset of the plurality of devices based on comparing the location signature to be identified with the location signature for each device.

15. The computer-readable medium of claim 11, wherein the instructions, when executed, cause the processor to:

determine the plurality of devices based on users for whom a time since prompting for location exceeds a threshold; and retrieve the location for each device by requesting each device prompt an associated user for the location.

* * * * *

UNITED STATES PATENT AND TRADEMARK OFFICE
CERTIFICATE OF CORRECTION

PATENT NO. : 10,285,011 B2  
APPLICATION NO. : 15/771661  
DATED : May 7, 2019  
INVENTOR(S) : Robert C Brooks et al.

Page 1 of 1

It is certified that error appears in the above-identified patent and that said Letters Patent is hereby corrected as shown below:

On the Title Page

In Column 1, item (73), Assignee, Line 1, delete "Hewett-Packard" and insert -- Hewlett-Packard --, therefor.

Signed and Sealed this  
Twenty-seventh Day of August, 2019

Andrei Iancu  
*Director of the United States Patent and Trademark Office*